Sept. 6, 1966  
TAKASHI HIGUCHI  
3,270,615  
THREE COMPONENT ZOOM LENS FOR PHOTOGRAPHIC MINIATURE CAMERAS  
Filed July 11, 1962

INVENTOR.  
TAKASHI HIGUCHI  
BY  
ATTORNEY

United States Patent Office 3,270,615
Patented Sept. 6, 1966

3,270,615
THREE COMPONENT ZOOM LENS FOR PHOTOGRAPHIC MINIATURE CAMERAS
Takashi Higuchi, Hodogaya-ku, Yokohama-shi, Japan, assignor to Nippon Kogaku, K.K., Tokyo, Japan, a corporation of Japan
Filed July 11, 1962, Ser. No. 209,024
Claims priority, application Japan, Aug. 15, 1961, 36/28,904
3 Claims. (Cl. 88—57)

With prior art zoom lens designs of two components, one of which is negative and the other positive as illustrated in FIGURE 1, an unbalance is likely to occur in the corrections for aberration resulting from changes in the focal length, especially over-correction for spherical aberration when long focal lengths are involved, because of the limited degree of freedom available in such designs for aberration correction.

The majority of the zoom lenses developed up to the present have been intended for use in motion-picture and television cameras, and it might be well observed that none of them could stand practical use in still cameras, which are subject to high performance demands as concerns their size and sharpness of image. And, specificially, in theory and in practice it is more difficult to produce zoom lenses, applicable also for photography of wide angular fields, for use in still cameras.

There are considered to be two plans for producing zoom lenses which should satisfy the demands for high performance:

(1) The focal lengths and the principal plane distances of the zooming components should be proportionally magnified so that the optical burden on each of the components of the optical system might be alleviated; and
(2) Non-spherical surfaces should be utilized.

Reflecting on these plans gives rise to the view, that perhaps the resulting zoom lens is of poor portability due to the increase in size and weight of the optical system to be mounted in a still camera on the one hand, and that of the questionable mass production of non-spherical lenses on the other. Hence the conclusion that such plans do not give a proper clue to the solution of the problem we are facing.

However, the present invention, without being made captive of either of such plans departs therefrom, and has made possible the development of a complete zoom lens system for use in still cameras, which system is not only of unique design, but also is of the least possible size and weight and has the best aberration correction attained. Furthermore, the invention has removed the above-mentioned defects and successfully developed a superior zoom lens system of remarkable aberration correction without incurring any increase in size.

A clear concept of the scope and purposes of this invention will be obtained from the following description taken with the drawing in which.

Figure 1:
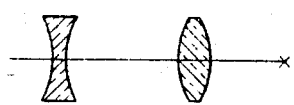
FIGURE 1 is a diagram illustrating the basic design of prior art zoom lenses comprising two components, a negative and a positive component in that order.
Figure 2:
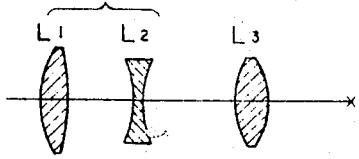
FIGURE 2 is a diagram illustrating the basic design of the present inventive lens comprising an immovable second negative, and mechanically movable first and third components.
Figure 3:
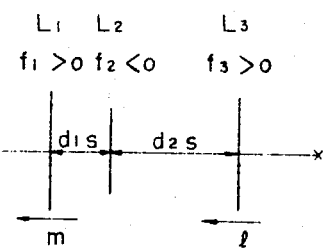
FIGURE 3 is a diagram illustrating the normal position of the components of the inventive lens prior to movement of the movable components.
Figure 4:
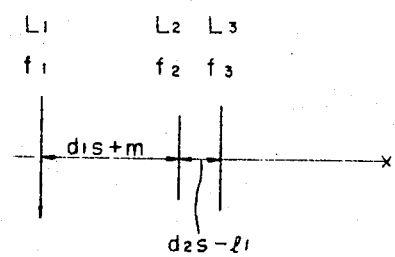
FIGURE 4 is a diagram illustrating the position of the components of the inventive lens, as the positive first and third components are moved by distances $m$ and $l$, respectively, from their normal positions with the negative second component remaining positioned therebetween.

In accordance with the invention, the first negative component of the prior art zoom lens design comprising two components, one negative and the other positive, is divided into two components: positive component $L_1$ and negative component $L_2$, so that the complete lens system comprises three components: positive component $L_1$, negative component $L_2$ and positive component $L_3$.

In other words, the first component $L_1$ is a convergent, the second component $L_2$ a divergent, and the third component $L_3$ a convergent, lens system; the positive first $L_1$ and third $L_3$ components being mechanically movable and the negative second component $L_2$ remaining immovable therebetween, thereby producing continuous magnification and always defining the focal plane at a certain definite spatial position.

On the other hand, the movement as a unit of the third positive component $L_3$ and the built-in aperture stop renders it possible to minimize the size of the over-all lens system and to stabilize corrections of the aberrations. The use of a positive lens as the first component $L_1$ expediently works for the bundle of rays, rendered convergent thereby, to be received by the second $L_2$ and its follower components to the complete solution of the over-correction problem, especially that of spherical aberration, without incurring heavy size of the over-all system.

Now assume the focal lengths for the first positive $L_1$ (movable), second negative $L_2$ (immovable) and the third positive $L_3$ (movable) components to be $f_1$, $f_2$ and $f_3$, respectively, and the spacings between the principal planes of the components to be $d_1$ and $d_2$, respectively. Further assume that the spacings are $d_{1S}$ and $d_{2S}$ in the case of the particular standard condition at which the over-all focal length of the system is the shortest, and that these spacings become $d_{1L}$ and $d_{2L}$ when the third positive component $L_3$ is moved distance $l$ from its position in said standard condition. Then, when it is desired to determine the necessary distance $m$ for the first positive component $L_1$ to move in terms of distance $l$ through which the third positive component $L_3$ has moved from its standard position, so as to have the focal plane always at a certain definite spatial point during image magnification, the following formulae are obtained:

$$l = d_{2S} - d_{2L} \tag{1}$$

$$m = d_{1L} - d_{1S}$$
$$= f_1 - d_{1S} + \frac{f_2(d_{2S}-l)(b_{3S}+l-f_3) - f_2 \cdot f_3(b_{3S}+l)}{(d_{2S}-l)(b_{3S}+l-f_3) - f_3(b_{3S}+l) - f_2(b_{3S}+l-f_3)} \tag{2}$$

where $b_{3S}$ denotes the distance between the image point and the third positive component $L_3$, the image point being formed of the infinity object point by the first positive $L_1$, the second negative $L_2$ and the third positive $L_3$ components as they are positioned in said standard condition.

And the most effective combination of $f_1$, $f_2$ and $f_3$ in connection with the optical performance of the lens, the zoom ratio, the functions of the movable components and other items, meets the following conditions:

$$0.2f_1 \leq |f_2| \leq 0.5f_1 \tag{3}$$

$$0.9|f_2| \leq f_3 \leq 1.8|f_2| \tag{4}$$

Figure 5:
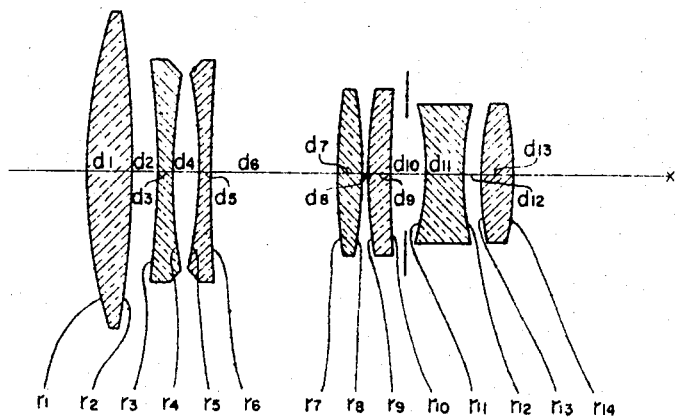
FIGURE 5 is an illustrative embodiment in accordance with the invention.

A practical example of zoom lens design in accordance with the invention will now be described in connection with the illustrative embodiment thereof of FIGURE 5 obtainable on the basis of the functions of the movable components, under a number of limitations set from the viewpoint of aberration correction, which include:

I. The first positive component $L_1$ is moved in unison with the third positive component $L_3$, and, in order to correct for unbalanced astigmatism and the negative distortion in the wide angular field as well as to improve the sine condition, the most forwardly surface of the first positive component $L_1$ has a radius of curvature $r_1$ within the limits:

$$0.5f_1 \leq r_1 \leq 1.1f_1 \quad (5)$$

II. The second negative component $L_2$ is made the immovable component and divided into a plurality of two or three elements (two are shown in FIGURE 5) to prevent over-correction for spherical aberration when long focal lengths are involved; and, to remove distortion aberration when a wide angular field is involved, the first surface of the most forwardly element of the divided component $L_2$ has the selected radius of curvature $r_3$ and the second surface of $r_4$, lying within the limits:

$$1.2N|f_2| \leq |r_3| \leq \infty \quad (6)$$

$$0.4N|f_2| \leq r_4 \leq 1.5N|f_2| \quad (7)$$

III. The third positive component $L_3$ is moved in connection with the first positive component $L_1$ and, to have it function as the image forming component, is provided with a built-in aperture stop. This component consists of two or three positive elements (two being shown in FIGURE 5) one negative element and, rearmost, one positive element, the negative element satisfying the following conditions:

$$0.9f_3 \leq |r_{11}| \leq 1.8f_3 \quad (8)$$

$$0.5f_3 \leq r_{12} \leq 1.3f_3 \quad (9)$$

where $r_{11}$ and $r_{12}$ denote the radii of curvature of the first and second surfaces of the negative element, respectively. These conditions work to effectively remove unbalances in aberration or changes in focal length produced by the first positive $L_1$ and the second negative $L_2$ components; above all, Condition 8 is effective for correcting for spherical aberration and curvature of image field, and Condition 9 for improving the sine condition and removing coma and astigmatism, contributing thereby to the successful design of zoom lenses of small size and best aberration correction.

The inventive zoom lens contemplates the use thereof in still cameras, but it is also capable of use in motion-picture and television cameras.

Data of an illustrative embodiment of the invention are given below:

where $r_1, r_2 \ldots r_{14}$ denote the radii of the curvature of respective component elements;

$d_1, d_2 \ldots d_{13}$, the thicknesses of the respective component elements and of the air spacings therebetween, both on the optical axis;

$n_1, n_2 \ldots n_7$, the indices of refraction of the respective glass materials measured for the D-line of spectrum; and $v_1, v_2 \ldots v_7$, the Abbe numbers for said glass materials.

As has been stated, the production of a zoom lens for still cameras fulfilling the demand for very sharp image formation is rather difficult practically and theoretically, so long as the prior art design is accepted as the guide. In contrast, the adoption of the design of the lens system in accordance with the invention enables the construction of zoom lenses extremely small in size and best corrected for aberration.

Furthermore, the production of cameras with the compact built-in zoom lens provided by the invention spares the user thereof the trouble of mounting ancillary or interchangeable lenses, and provides means to control a covering power, ranging from the wide angular field to that of telephotography, with the use of but a single lens, improving to a remarkable extent proper maneuverability of still cameras.

What I claim is:

1. A zoom lens comprising three components of which the first is a positive movable component of focal length $f_1$, the second is an immovable negative component consisting of a plurality N up to three biconcave airspaced negative lens elements, the second component having a focal length of $f_2$, and the third is a positive movable component of focal length $f^3$, and consisting of two positive lens elements, a negative lens element and a positive lens element air spaced in that order, the second component is spatially fixed between the first and third mechanically movable components, the lens array satisfying the following conditions:

$$0.5f_1 \leq r_1 \leq 1.1f_1$$
$$0.2f_1 \leq f_2 \leq 0.5f_1$$
$$0.9|f_2| \leq f_3 \leq 1.8|f_2|$$
$$1.2Nf_2 \leq r_3 \leq \infty$$
$$0.4N|f_2| \leq r_4 \leq 1.5N|f_2|$$
$$0.9f_3 \leq |r_{11}| \leq 1.8f_3$$
$$0.5f_3 \leq r_{12} \leq 1.3f_3$$
$$l = d_{2S} - d_{2L}$$
$$m = f_1 - d_{1S} + \frac{f_2(d_{2S}-l)(b_{3S}+l-f_3) - f_2f_3(b_{3S}+l)}{(d_{2S}-l)(b_{3S}+l-f_3) - f_3(b_{3S}+l) - f_2(b_{3S}+l-f_3}$$

where $r_{\text{subscript}}$ is the radius of curvature of the succes-

EXAMPLE

[$f = 100$ to $188$]

| | | | | |
|---|---|---|---|---|
| The first positive component $f_1 = 197.97$ ($L_1$). | $r_1 = +169.917$ | $d_1 = 12.82$ | $n_1 = 1.61948$ | $v_1 = 53.9$ |
| | $r_2 = -428.034$ | $d_2 = 7.13$ to $36.24$ | | |
| The second negative component $f_2 = -60.45$ ($L_2$). | $r_3 = -189.759$ | $d_3 = 1.91$ | $n_2 = 1.67005$ | $v_2 = 47.0$ |
| | $r_4 = +120.781$ | $d_4 = 8.75$ | | |
| | $r_5 = -120.781$ | $d_5 = 1.91$ | $n_3 = 1.67005$ | $v_3 = 47.0$ |
| | $r_6 = +515.788$ | $d_6 = 42.25$ to $10.11$ | | |
| The third positive component $f_3 = 75.45$ ($L_3$). | $r_7 = +196.877$ | $d_7 = 7.94$ | $n_4 = 1.69227$ | $v_4 = 53.3$ |
| | $r_8 = -123.387$ | $d_8 = 0.32$ | | |
| | $r_9 = +61.130$ | $d_9 = 8.26$ | $n_5 = 1.69227$ | $v_5 = 53.3$ |
| | $r_{10} = +276.117$ | $d_{10} = 13.50$ | | |
| | $r_{11} = -119.362$ | $d_{11} = 17.79$ | $n_6 = 1.73954$ | $v_6 = 27.7$ |
| | $r_{12} = +66.393$ | $d_{12} = 6.35$ | | |
| | $r_{13} = +241.990$ | $d_{13} = 11.12$ | $n_7 = 1.70063$ | $v_7 = 40.7$ |
| | $r_{14} = -75.107$ | | | | sive surfaces of the lens elements, the subscripts increasing in the order of location of the respective surface from the object to the image side of the zoom array, $m$ is the distance through which the first component is movable, $l$ is the distance through which the third component is movable, $d_{1S}$ the air spacing between the principal planes of the first and second components, $d_{2S}$ the air spacing between the principal planes of the second and third components, both $d_{1S}$ and $d_{2S}$ being taken at the component positions at which the overall focal length of the zoom array is the shortest, $d_{1L}$ and $d_{2L}$ the air spacings between such principal planes when the third component has moved the distance $l$ and the first component the distance $m$, and $b_{3S}$ is the distance between the third component and the image point formed by the object point at infinity by the first, second and third components when each is at its position for the minimum overall focal length of the zoom lens array.

2. The zoom lens according to claim 1 in which N, the number of lenses in the second component, is two.

3. The zoom lens according to claim 2 having the following detailed data:

[Overall focal length—minimum 100; maximum 188]

| | | $d_1$=12.82 | $n_1$=1.61948 | $v_1$=53.9 |
|---|---|---|---|---|
| First compenent $f$=197.97 | $r_1$ =+169.17 | | | |
| | $r_2$=−428.034 | $d_2$=7.13 to 36.24 | | |
| | $r_3$=−189.759 | $d_3$=1.91 | $n_2$=1.67005 | $v_2$=47.0 |
| Second component $f_2$= −60.45 | $r_4$=+120.781 | $d_4$=8.75 | | |
| | $r_5$=−120.781 | $d_5$=1.91 | $n_3$=1.67005 | $v_3$=47.0 |
| | $r_6$=+515.788 | $d_6$=42.25 to 10.11 | | |
| | $r_7$=+196.877 | $d_7$=7.94 | $n_4$=1.69227 | $v_4$=53.3 |
| | $r_8$=−123.3877 | $d_8$=0.32 | | |
| | $r_9$=+61.130 | $d_9$=8.26 | $n_5$=1.69227 | $v_5$=53.3 |
| Third component $f_3$= 75.45 | $r_{10}$=+276.117 | $d_{10}$=13.50 | | |
| | $r_{11}$=−119.362 | $d_{11}$=17.79 | $n_6$=1.73954 | $v_6$=27.7 |
| | $r_{12}$=+66.393 | $d_{12}$=6.35 | | |
| | $r_{13}$=+241.990 | $d_{13}$=11.12 | $n_7$=1.70063 | $v_7$=40.7 |
| | $r_{14}$=−75.107 | | | | where $r_{subscript}$ denotes the radius of curvature of the respective lens element surface, $d_{subscript}$ the thickness of the respective lens element and the respective air space, $n_{subscript}$ the index of refraction for the D-line of the spectrum of the optical material of the respective lens element, and $v_{subscript}$ the Abbe number thereof, the respective subscripts of each of $r$, $d$, $n$, and $v$ increasing in the order of their location from the object to the image side of the lens array.

References Cited by the Examiner

UNITED STATES PATENTS 2,847,907  8/1958  Angenieux _____ 88—57
3,023,673  3/1962  Cox et al_____ 88—57
3,127,466  3/1964  Walters _____ 88—57

OTHER REFERENCES

Wright: "Boom in Zoom for 35-mm.", Photography, vol. 50, No. 5, May 1962, pp. 56–61.

DAVID H. RUBIN, *Primary Examiner.*

JEWELL H. PEDERSEN, *Examiner.*

JOHN K. CORBIN, *Assistant Examiner.*